United States Patent
Maestrini et al.

(10) Patent No.: US 8,428,264 B2
(45) Date of Patent: Apr. 23, 2013

(54) METHOD AND SYSTEM FOR WIRELESS CONNECTING A MOBILE DEVICE TO A SERVICE PROVIDER THROUGH A HOSTING WIRELESS ACCESS NODE

(75) Inventors: Angelo Maestrini, Ruvigliana (CH); Fabio de Vito, Lecce (IT); Davide Lenzarini, Faloppio (IT)

(73) Assignee: PeerTribe SA, Lugano (CH)

( * ) Notice: Subject to any disclaimer, the term of this patent is extended or adjusted under 35 U.S.C. 154(b) by 0 days.

(21) Appl. No.: 13/318,061

(22) PCT Filed: Apr. 30, 2009

(86) PCT No.: PCT/EP2009/055289
§ 371 (c)(1),
(2), (4) Date: Oct. 28, 2011

(87) PCT Pub. No.: WO2010/124739
PCT Pub. Date: Nov. 4, 2010

(65) Prior Publication Data
US 2012/0045060 A1    Feb. 23, 2012

(51) Int. Cl.
*H04W 12/06* (2009.01)
*H04W 12/04* (2009.01)

(52) U.S. Cl.
USPC ............ 380/274; 713/171; 370/338; 455/411

(58) Field of Classification Search ........................ None
See application file for complete search history.

(56) References Cited

U.S. PATENT DOCUMENTS

| | | | |
|---|---|---|---|
| 7,336,960 B2* | 2/2008 | Zavalkovsky et al. | 455/453 |
| 7,756,509 B2* | 7/2010 | Rajagopalan et al. | 455/411 |
| 7,769,175 B2* | 8/2010 | Bajar et al. | 380/270 |
| 7,962,123 B1* | 6/2011 | Yegani et al. | 455/411 |
| 8,160,254 B2* | 4/2012 | Cho et al. | 380/273 |
| 8,190,904 B2* | 5/2012 | Hatter et al. | 713/178 |
| 8,259,659 B2* | 9/2012 | Luft et al. | 370/329 |
| 8,327,143 B2* | 12/2012 | Ilyadis | 713/170 |
| 2008/0219230 A1* | 9/2008 | Lee et al. | 370/338 |
| 2009/0138713 A1* | 5/2009 | Veillette | 713/171 |
| 2009/0280774 A1* | 11/2009 | Patel et al. | 455/410 |
| 2010/0281270 A1* | 11/2010 | Miyazaki et al. | 713/189 |

OTHER PUBLICATIONS

Zhao, et al., "Addressing the vulnerability of the 4-way handshake of 802.11i", Digital Information Management, 2008. ICDIM 2008. Third International Conference on, IEEE, abstract only, (Nov. 13, 2008), 1 page.

(Continued)

*Primary Examiner* — Fikremariam A Yalew
(74) *Attorney, Agent, or Firm* — Fiala & Weaver P.L.L.C.

(57) ABSTRACT

A method and system for commissioning a wireless connection with a related authentication and the eventual encryption to a remote relay node, whereto an electronic mobile device is connected to a hosting wireless access node for transmitting/receiving data to/from a service provider available on the Internet by means of a commissioned relay access node selected by an authentication and commissioning manager. The data transfer between the mobile device and the service provider is encapsulated into the tunnel between the hosting wireless access node and the commissioned relay access node and is finally forwarded by the commissioned relay access node to the service provider. The service provider thereby is exchanging data with the commissioned relay access node and not directly with the hosting wireless access node.

20 Claims, 13 Drawing Sheets

OTHER PUBLICATIONS

Cam-Winget, et al., "The Flexible Authentication via Secure Tunneling Extensible Authentication Protocol Method (EAP-FAST)", IETF Standard, Internet Engineering Task Force, (May 2007), 65 pages.

Palekar, et al., "Protected EAP Protocol (PEAP) Version 2", IETF Standard-Working-Draft, Internet Engineering Task Force, No. 10, (Oct. 15, 2004), 87 pages.

* cited by examiner

METHOD AND SYSTEM FOR WIRELESS CONNECTING A MOBILE DEVICE TO A SERVICE PROVIDER THROUGH A HOSTING WIRELESS ACCESS NODE

CROSS-REFERENCE TO RELATED APPLICATION(S)

This application is a U.S. National Phase Application, which claims priority to PCT Application No. PCT/EP2009/055289 filed on Apr. 30, 2009, the entirety of which is incorporated by reference herein.

BACKGROUND

1. Field of the Invention

The present invention relates to a method and system for wireless connecting a mobile device to a service provider through a hosting wireless access node, in order to transmit/receive data between the mobile device and the service provider.

2. Background Art

Today an increasing number of electronic mobile devices 1, n are equipped with at least one physical wireless network interface, for connecting and transmitting data over a wireless network channel. Such mobile devices 1, n like Notebook PCs, netbook PCs, e-books, PDAs, smart-phones and also handheld game consoles, digital cameras and other similar devices can communicate over a wireless network channel of the type WiFi (IEEE 802.11 standard), WiMax (IEEE 802.16 standard), Bluetooth (IEEE 802.15.1 standard), ZigBee (IEEE 802.15.4 standard), Ultra-wideband (IEEE 802.15.3a standard) or similar others.

Figure 1:
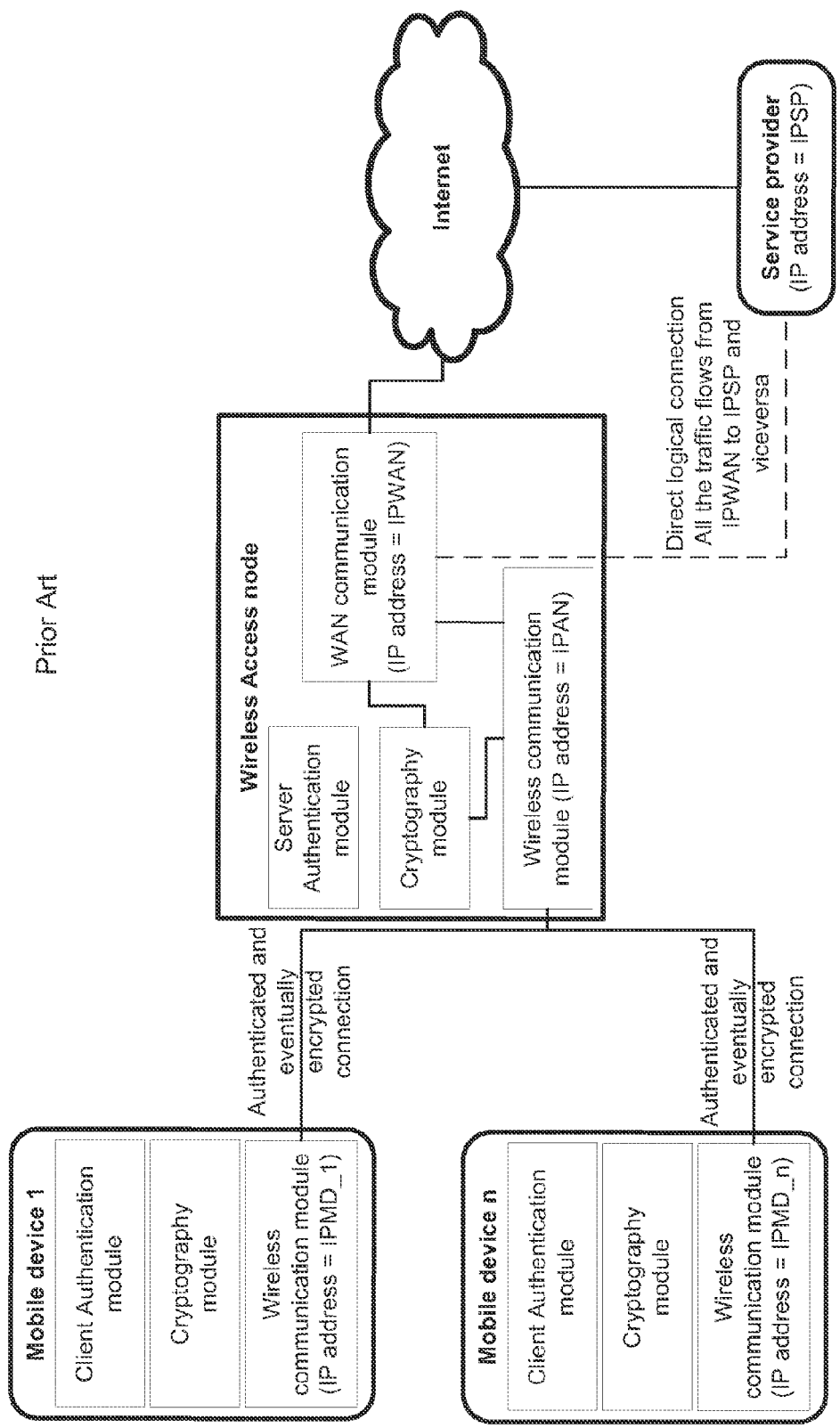

To provide a comfortable Internet access to the above mentioned mobile devices 1, n it is very common to install one or more wireless access nodes at home, at the office, at places of social aggregation, at lifestyle or entertainment locations or similar, as schematically represented in FIG. 1. The wireless access node can be coupled with a broadband Internet connection modem on the same appliance or on a different appliance. In this latter case it can be directly or indirectly connected to the broadband Internet connection modem; indirectly for instance in case of wireless mesh networks or ad hoc networks or piconets or scatternets or when a wireless distribution system is used to interconnect the access nodes.

Usually the IP address assigned to a mobile device 1, n connected wirelessly is NATted (i.e. translated by a Network Address Translator) behind the WAN IP address of the modem and so each service provider available in Internet, like web servers or ftp servers or email servers or communication servers or database servers or game servers or peer-topeer servers, identifies the modem and not the NATted mobile device as the source of the traffic.

A drawback of this method of wireless connecting is that all the traffic generated by a mobile device 1, n connected to a wireless access node is identified as being generated by the broadband Internet connection modem owner which, in this way, is responsible of the traffic generated according to the applicable current local and international regulations and laws.

This, each time a broadband Internet connection modem owner allows a mobile device 1, n to connect to Internet through one of his/her wireless access nodes, he/she takes the responsibility of its traffic and this can be very dangerous in case of illegal behaviors.

Figure 2:
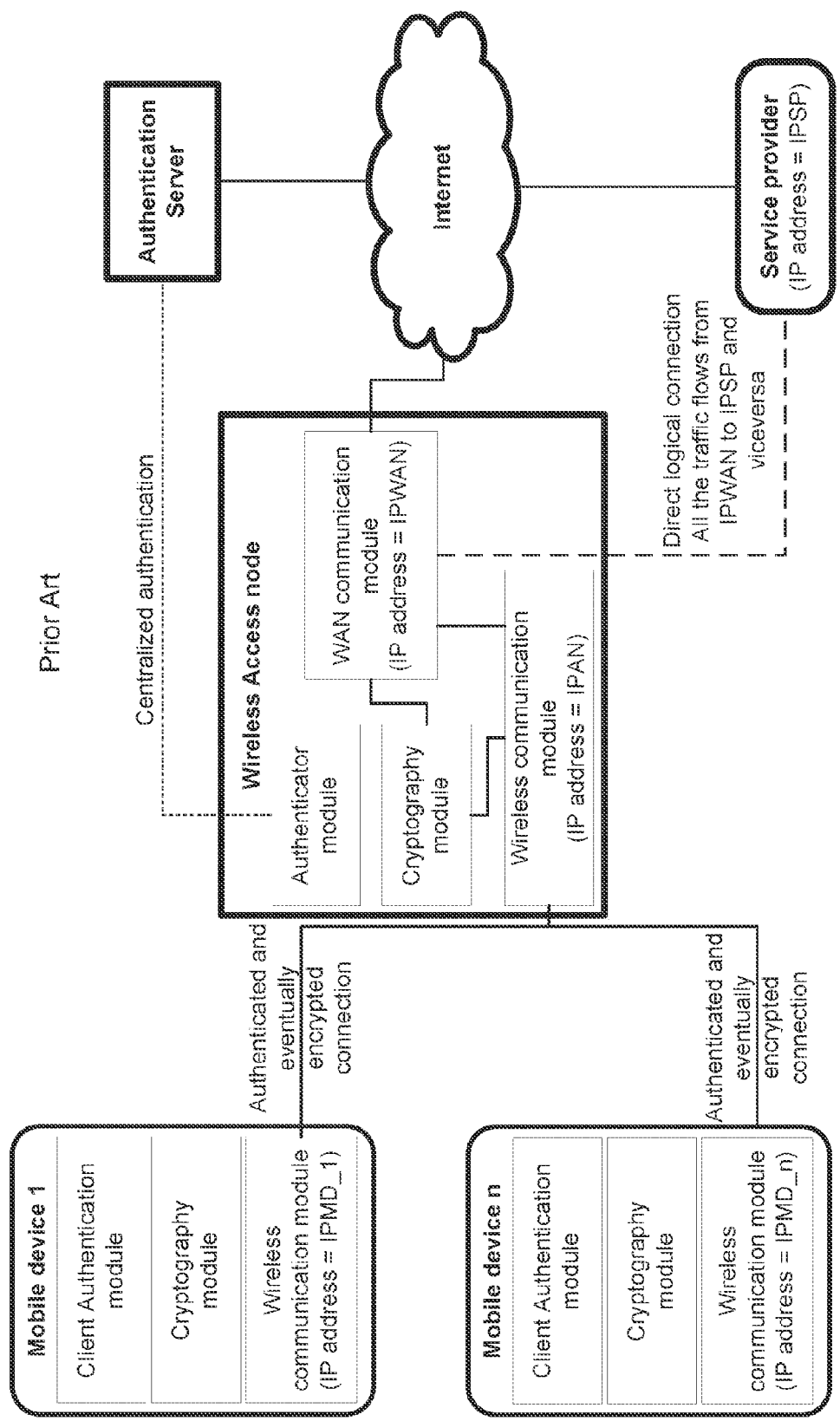

To prevent this problem, known prior art methods provide to authenticate and eventually encrypt the wireless connection in order to grant the Internet connection only to authorized mobile devices 1, n. The eventual encryption is usually handled by a cryptography module available on the mobile device and a cryptography module available on the wireless access node, as schematically represented in FIGS. 1 and 2. The authentication instead can be handled by at least two different prior art methods:

by a client authentication module available on the mobile device and a server authentication module available on the wireless access node (FIG. 1);

by a client authentication module available on the mobile device and an authenticator module interacting with an authentication server available locally or eventually in Internet (FIG. 2).

The first method is usually managed by the wireless access node owner while the second method can be managed by an entity different from the access node owner. More particularly, in the first method the authentication is provided by a pre-shared key and if WiFi is the wireless technology used the encryption is provided for instance by using WEP (Wired Equivalent Pricacy), WPA-PSK (WiFi Protected Access—Pre-Shared Key) or WPA2-PSK (IEEE 802.11i standard—Pre-Shared Key). Instead in the second method the authentication is provided by a IEEE 802.1X like system and if WiFi is the wireless technology used the authentication and the encryption are provided for instance by using WPA-Enterprise or WPA2-Enterprise and so by using one of the EAP methods (Extensible Authentication Protocol defined in RFC 3748 and RFC 5247) like EAP-TLS (Transport Layer Security—RFC 5216), EAPTTLS (Tunneled Transport Layer Security—RFC 5281), PEAPvO/EAPMSCHAPv2, PEAPv1/EAP-GTC or EAP-SIM (GSM Subscriber Identity Modules—RFC 4186).

An example of the second method cited above, providing only authentication but not encryption, is the captive portal implementation in which the client authentication module is represented by any web browser. The captive portal technique forces an HTTP client on a mobile device to see an authentication web page before accessing the Internet normally. This is done by dropping all packets until the user opens a browser and tries to access the Internet. At that time the browser is redirected to a web page which require authentication.

However, the second method is subject to identity-theft and usurpation. For instance if WiFi is the technology used, once the captive portal authentication is completed, the IP and MAC addresses of the connecting mobile devices are authorized to reach the Internet through the hosting wireless access node. Hence it is possible to easily commit identity-theft and usurpation by spoofing the MAC and IP addresses of the authenticated target and using the hosting wireless access node to reach the Internet. In addition to the security risk for the broadband Internet connection modem owner since all traffic generated by the connected mobile device is identified as being generated by the broadband Internet connection modem owner itself, also the guest mobile device owner is risking that his/her spoofed MAC and IP addresses can be used to commit potential illegal actions and crimes in his/her name.

The above indicated method is not able to grant a high level of confidence to the broadband Internet connection modem owners and guests mobile device owners. This is clear from FIG. 1 and FIG. 2, wherein it is schematically represented the traffic generated by the guest mobile devices (mobile devices 1, n) and exchanged with an Internet service provider (Service provider) which has, as source address, the WAN IP address assigned to the owners.

The problem at the base of the present invention is that the IP and MAC addresses of connecting mobile devices are authorized to reach the Internet through the hosting wireless access node and it is possible to easily commit identity-theft and usurpation by spoofing the MAC and IP addresses of the authenticated target and using the hosting wireless access node to reach the Internet. At the same time, the guest mobile device owner risks that his/her spoofed MAC and IP addresses can be used to commit potential illegal actions and crimes in his/her name.

SUMMARY

The solution idea at the base of the present invention is to provide a method and system to protect the broadband Internet connection modem owner and the guest mobile device owner from the potential security risks of identity-theft and usurpation, allowing the guest mobile devices to connect to the Internet through the broadband Internet connection modem owner wireless access nodes. More particularly, the solution idea is to commissioning a wireless connection with a related authentication to a commissioned relay access node selected by an authentication and commissioning manager and in particular by encapsulating the data transferred between a guest mobile device and an Internet service provider into a tunnel between the hosting wireless access node and the commissioned relay access node, wherein data are finally forwarded by the commissioned relay access node to the Internet service provider. Thus, the method is able to guarantee to the owner of wireless access nodes with a broadband Internet connection that the Internet service provider is exchanging data with the commissioned relay access node and not directly with his/her hosting wireless access node.

Advantageously, the method and system according to the present invention provides a flexible, secure and trusted data exchange infrastructure among the hosting wireless access node, the commissioned relay access node and the guest mobile device, to exchange data between a guest mobile device and a service provider on the Internet through a hosting wireless access node, in order to reduce and hence minimize the potential security risks of identity-theft and usurpation. Moreover, this method and system allows implementation and optimization flexibility to adapt to various existing architectures, systems and mobile devices not granted by the prior art. The commissioning of the wireless connection through the relay node, the flexibility of the separation and distinct management of the encapsulation and the authentication and the eventual encryption and the OSI layer 2 network processing provide unique innovation value to this invention.

According to this solution idea, the technical problem mentioned above is solved by a method for commissioning a wireless connection with a related authentication to a remote relay node, whereto an electronic mobile device is connected through at least one wireless communication module to a hosting wireless access node for transmitting/receiving data to/from a service provider available on the Internet by means of a commissioned relay access node selected by an authentication and commissioning manager, the method comprising—an association phase performed at OSI layer 2 initiated by the mobile device wireless communication module to establish a connection with at least one wireless communication module of the hosting wireless access node;—an identification phase performed at OSI layer 2 initiated by an authentication module of the hosting wireless access node to retrieve from a client authentication module of the mobile device at least its authentication credentials provided by an authentication credentials module;—an access verification phase initiated by the hosting wireless access node authentication module to retrieve from an authentication server of the authentication and commissioning manager the commissioned relay access node to be used;—a commissioned relay access node selection phase initiated by the authentication server to retrieve from a commissioned relay access node selector of the authentication and commissioning manager the commissioned relay access node to be used; —a tunnel creation phase initiated by a tunnel/optimization module of the hosting wireless access node to establish a tunnel with a tunneling/optimization module of the commissioned relay access node; —a transfer of the authentication state phase initiated by the hosting wireless access node authentication module to transfer at least the mobile device authentication credentials to an authentication module of the selected commissioned relay access node; the transfer being encapsulated into the tunnel;—an authentication phase performed at OSI layer 2 initiated by the commissioned relay access node authentication module to handshake with the mobile device client authentication module the authentication data used to establish a trusted connection between the commissioned relay access node and the mobile device; the handshaking, using OSI layer 2 data units, being encapsulated into the tunnel between the commissioned relay access node and the hosting wireless access node; —a data transfer phase to transfer data between the mobile device and the service provider; the data exchanged by the mobile device 1, contained in OSI layer 2 data units and transmitted on the wireless connection with the hosting wireless access node 2, is encapsulated into the tunnel between the hosting wireless access node and the commissioned relay access node; the data is then extracted from the OSI layer 2 data units and finally forwarded by the commissioned relay access node to the service provider; the service provider there by is exchanging data with the commissioned relay access node and not directly with the hosting wireless access node.

Further characteristics and the advantages of the method according to the present invention will be apparent from the following description of an embodiment thereof, made with reference to the annexed drawings, given for indicative and non-limiting purpose.

BRIEF DESCRIPTION OF THE DRAWINGS/FIGURES

FIG. 1: schematically shows, in a block diagram, the main components of a wireless access system in which the mobile device is authenticated locally by the wireless access node and it exchanges data with a service provider available in Internet directly by the wireless access node, according to a prior art method.

FIG. 2: schematically shows, in a block diagram, the main components of another wireless access system in which the mobile device is authenticated by a centralized authentication server and it exchanges data with a service provider available in Internet directly by the wireless access node, according to a prior art method.

Figure 3:
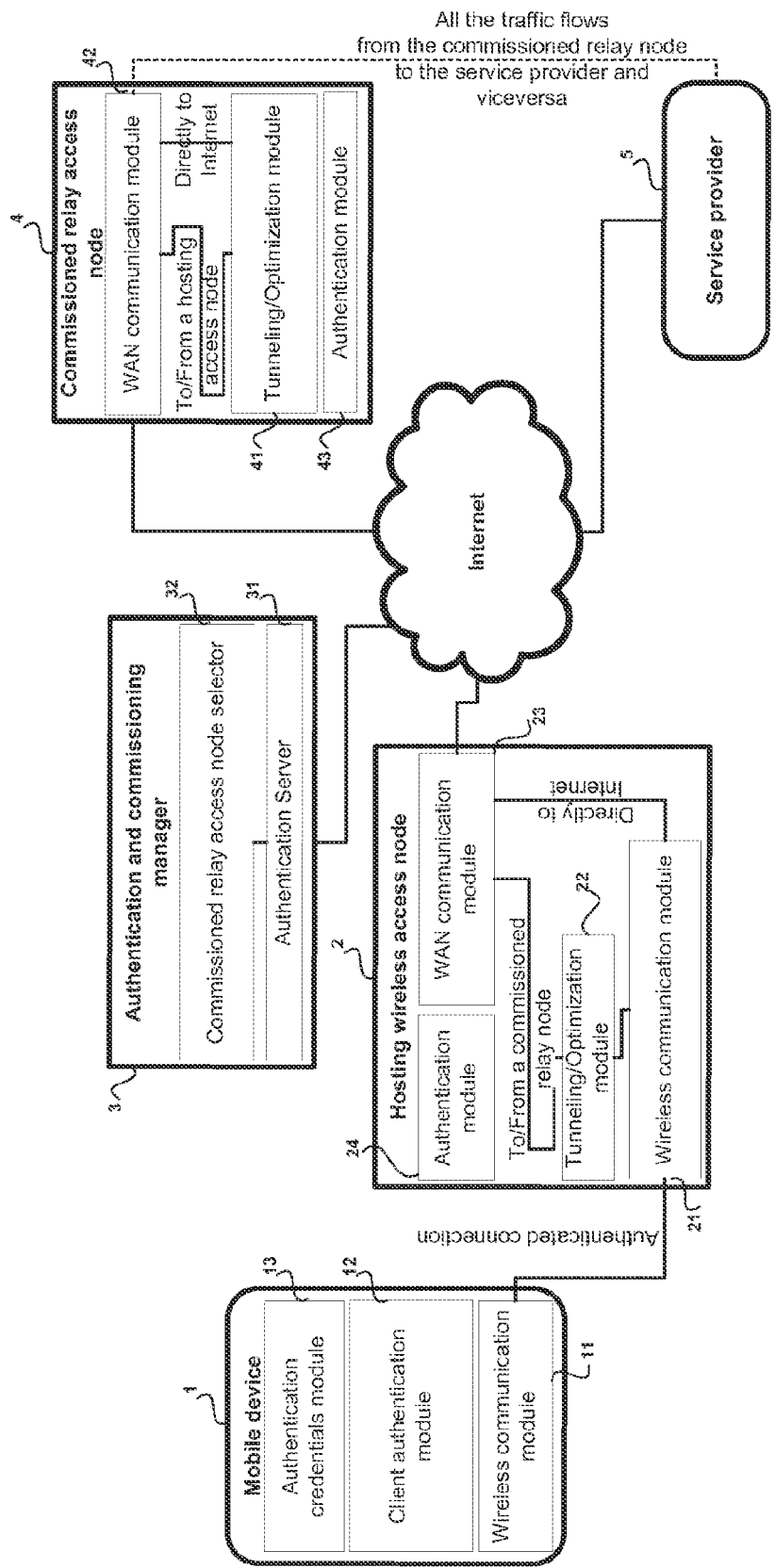

FIG. 3: schematically shows, in a block diagram, the components of the method and system for commissioning a wireless connection to a remote relay node, according to the method of the present invention.

Figure 4:
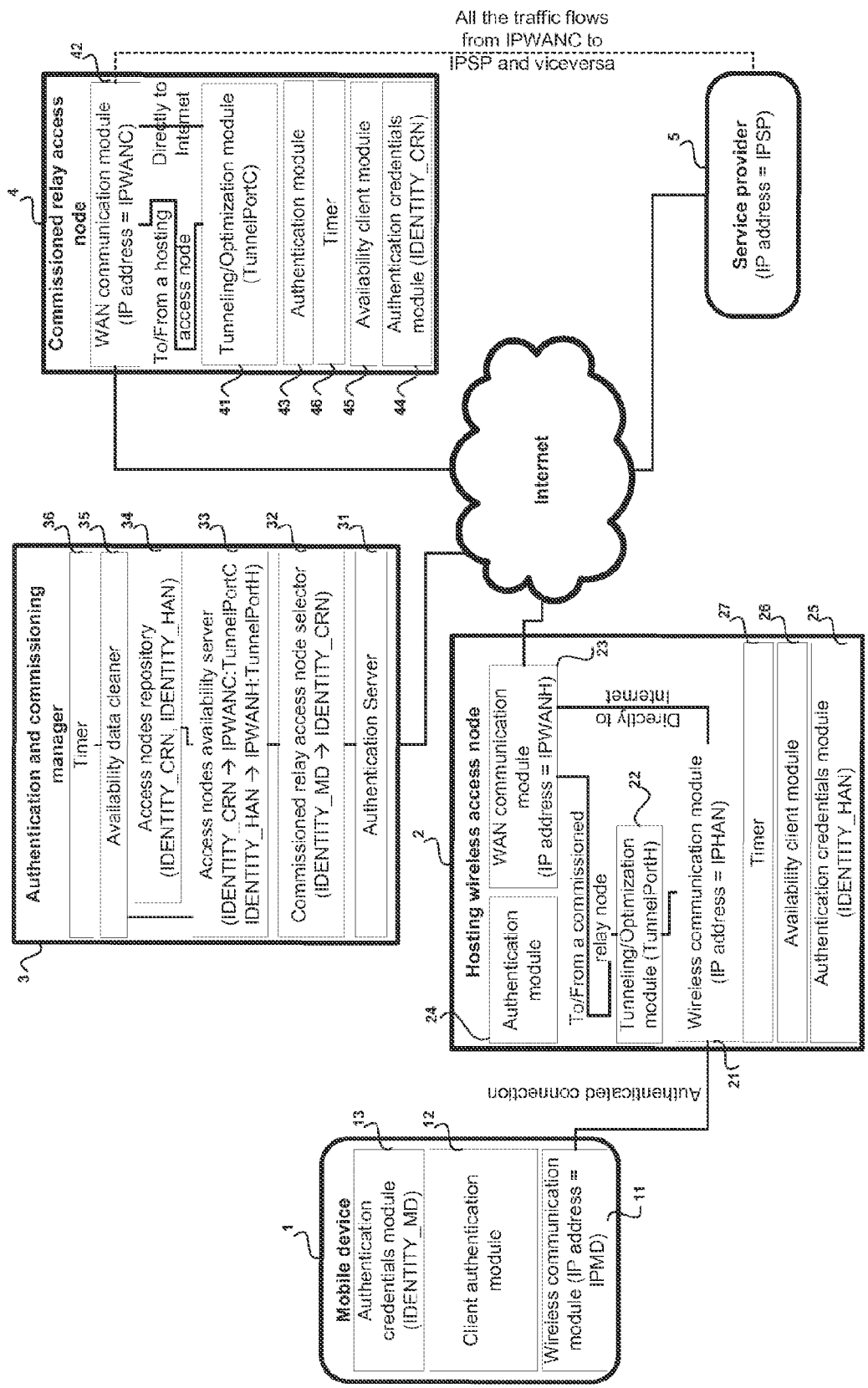

FIG. 4: schematically shows, in a block diagram, in further detail the components of the method and system for commissioning a wireless connection to a remote relay node, according to the method of the present invention.

Figure 5:
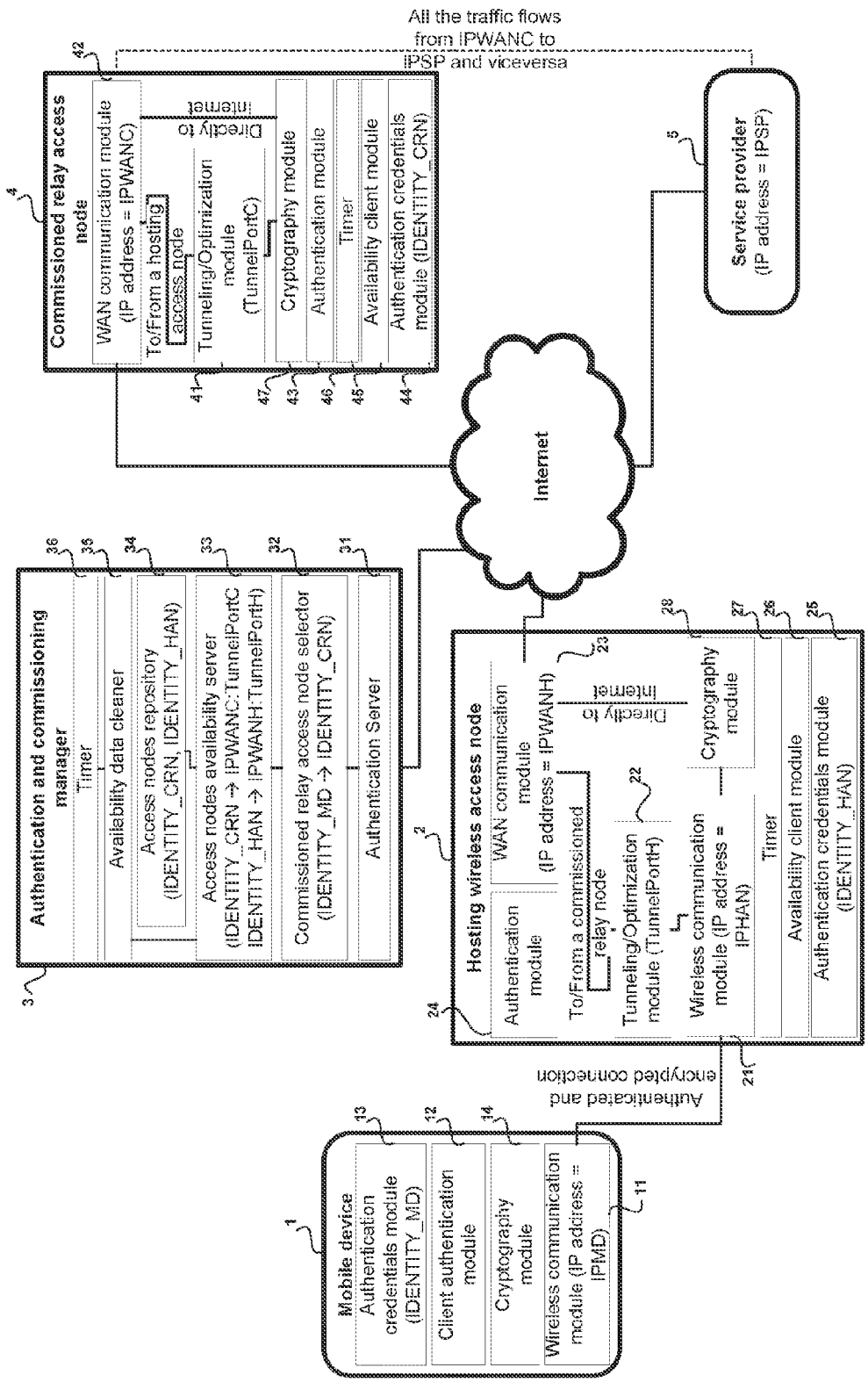

FIG. 5: schematically shows, in a block diagram, the components of the FIG. 4 together with cryptography modules.

Figure 6:
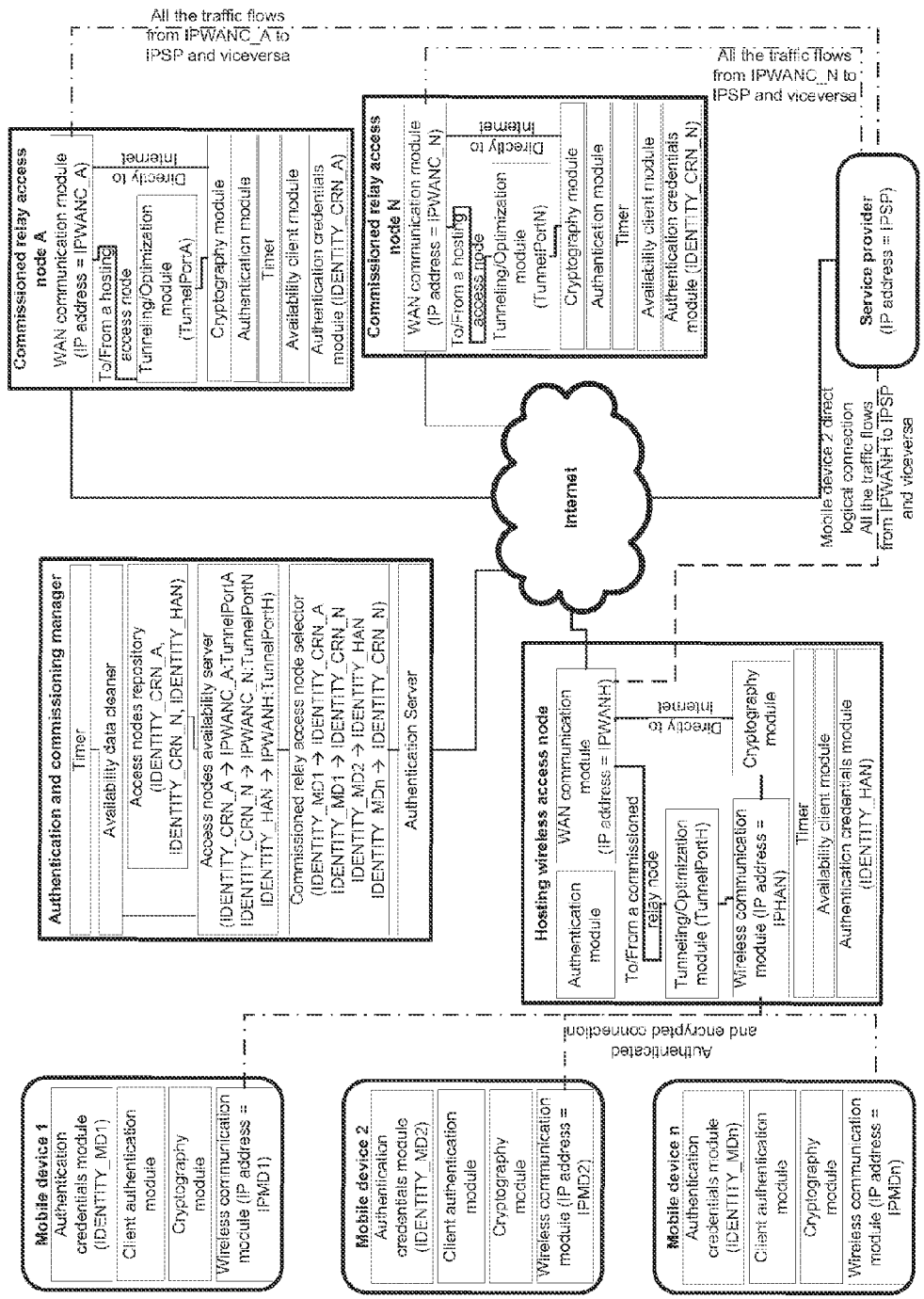

FIG. 6: schematically shows, in a block diagram, a plurality of mobile devices and access nodes interacting via the method and system for commissioning a wireless connection to a remote relay node, according to the method of the present invention.

Figure 7:
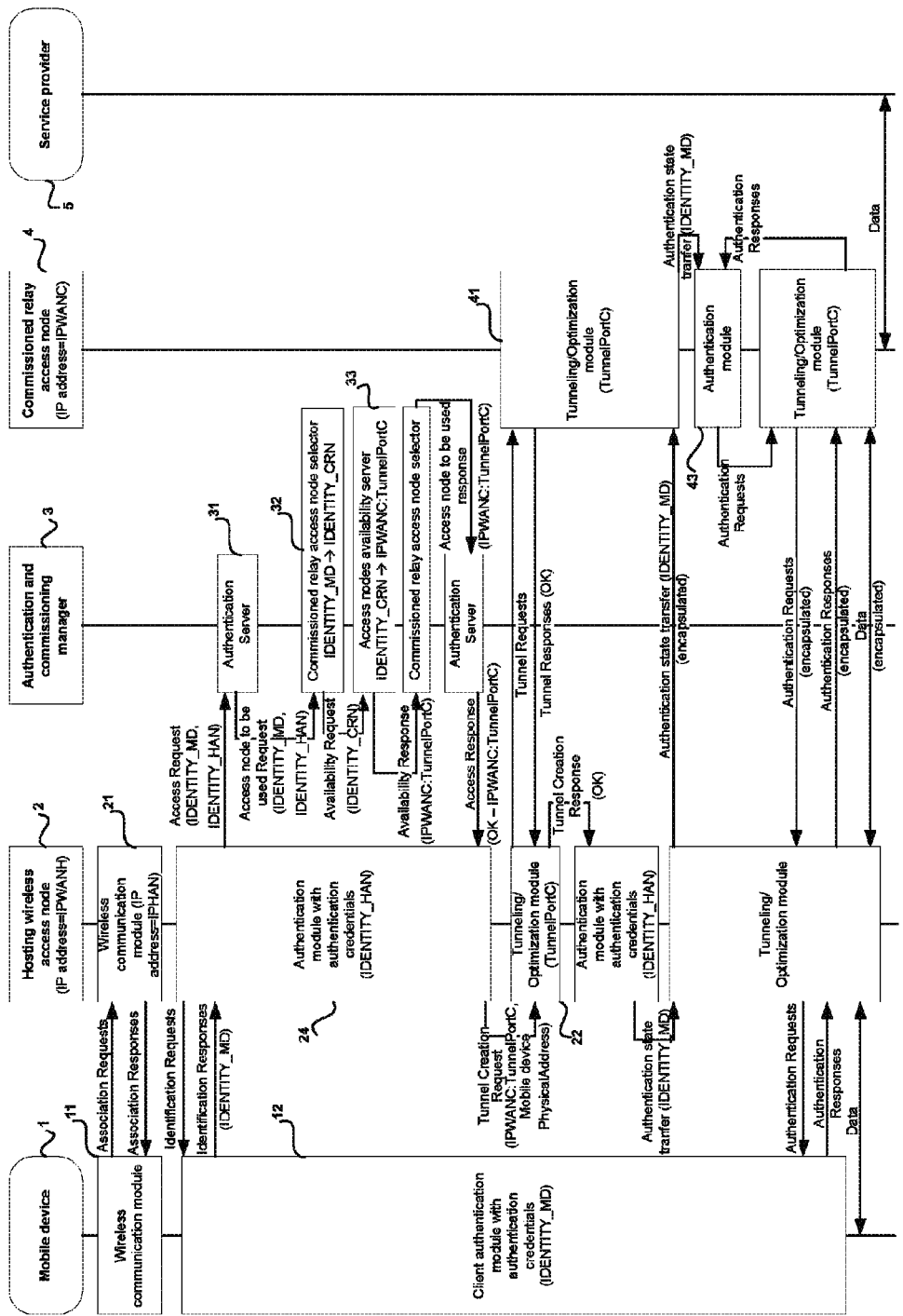

FIG. 7: schematically shows, in an activity diagram, the interactions among the components of the method and system for commissioning a wireless connection to a remote relay node, according to the method of the present invention.

Figure 8:
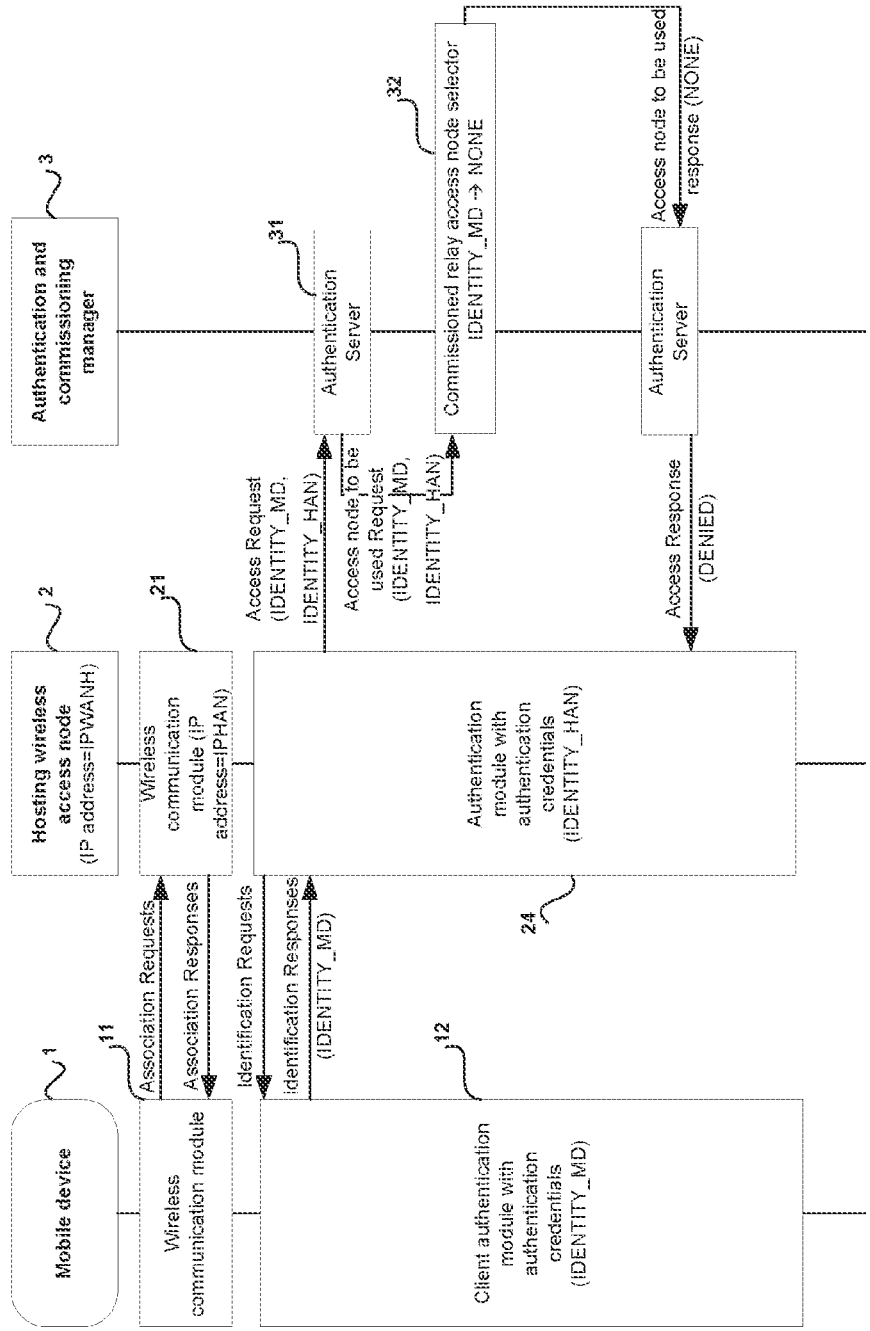

FIG. 8: schematically shows, in an activity diagram, the interactions among the mobile device, the hosting wireless access node and the authentication and commissioning server, if the commissioned relay access node selector is not able to select a commissioned relay access node, according to the method of the present invention.

Figure 9:
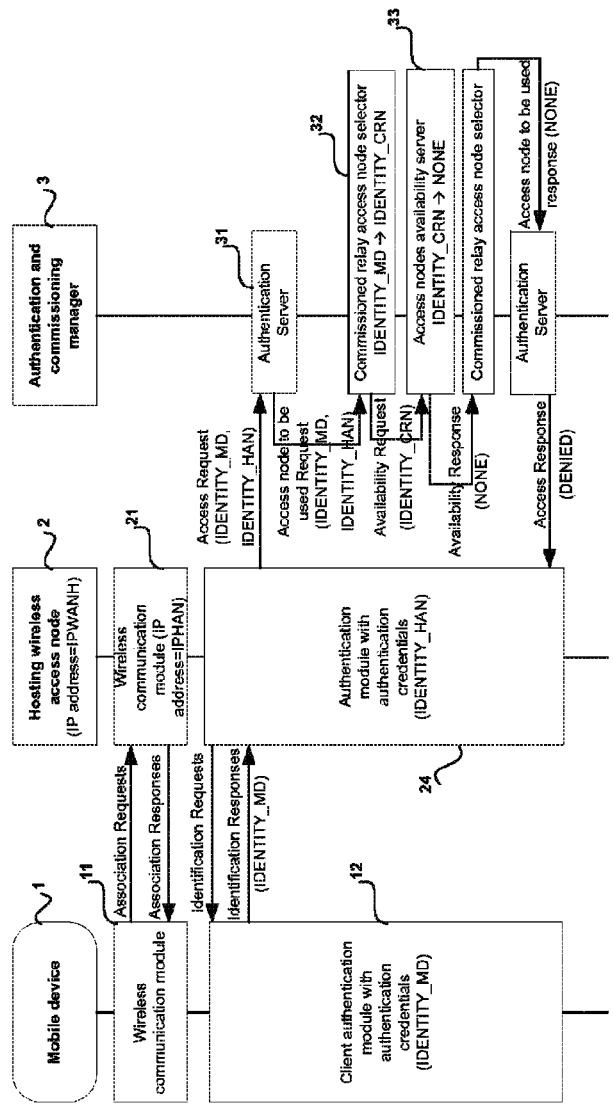

FIG. 9: schematically shows, in an activity diagram, all the interactions among the mobile device, the hosting wireless access node and the authentication and commissioning server, if the commissioned relay access node selected by the commissioned relay access node selector is not available, according to the method of the present invention.

Figure 10:
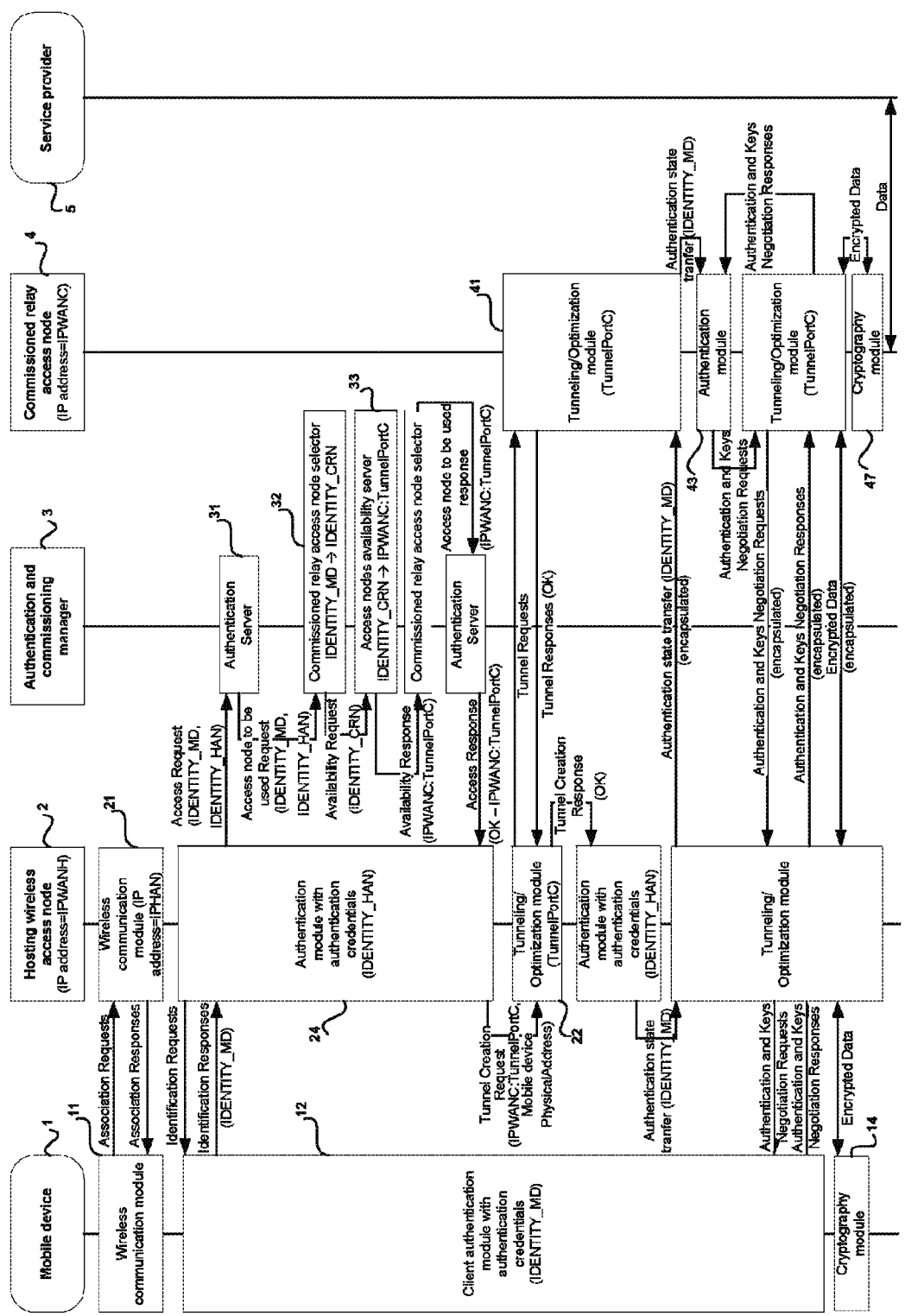

FIG. 10: schematically shows, in an activity diagram, the interactions among the components of the method and system for commissioning a wireless connection to a remote relay node, together with cryptography modules.

Figure 11:
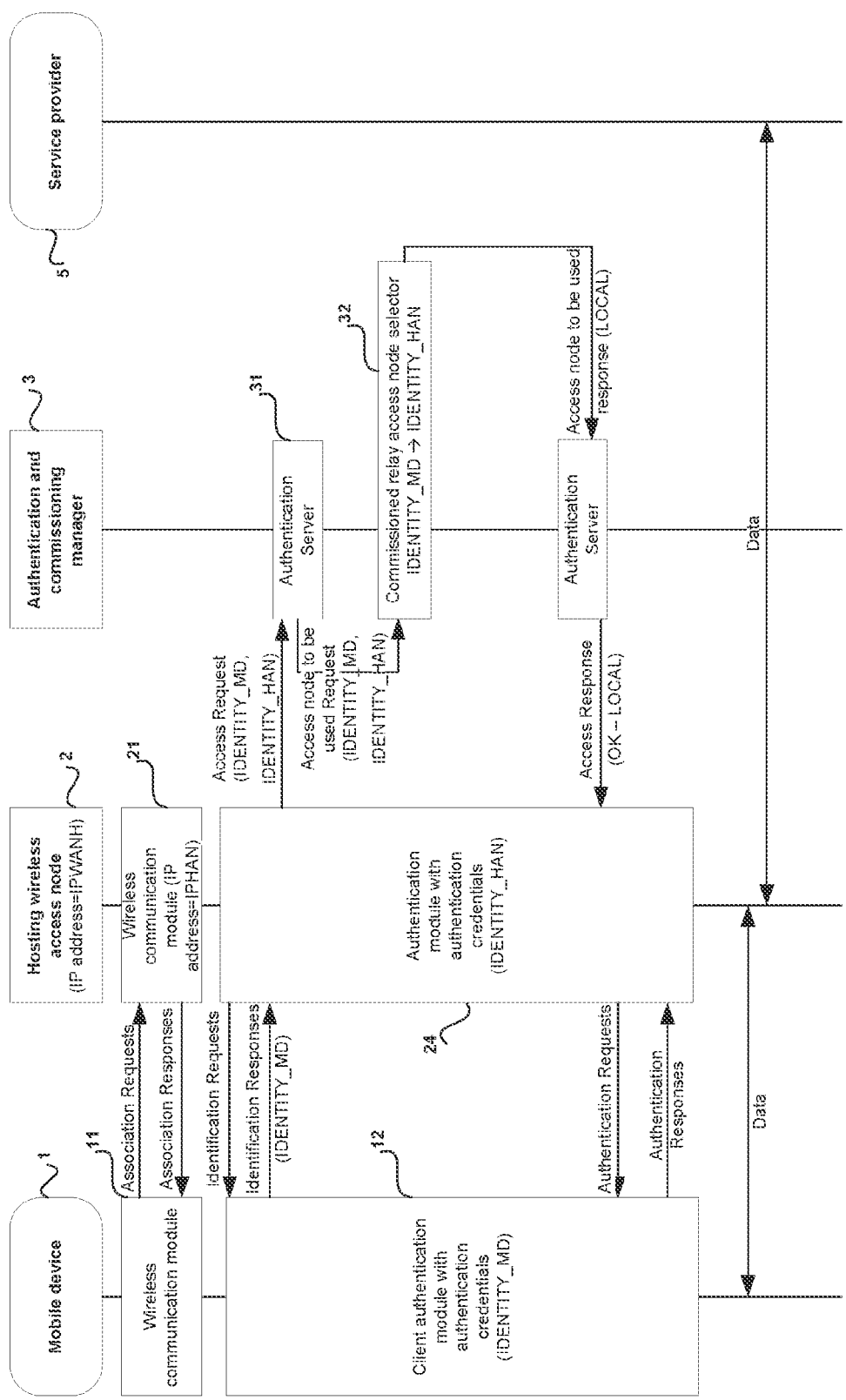

FIG. 11: schematically shows, in an activity diagram, the interactions among the mobile device, the hosting wireless access node and the authentication and commissioning server if the hosting wireless access node is selected as the commissioned relay access node, according to the method of the present invention.

Figure 12:
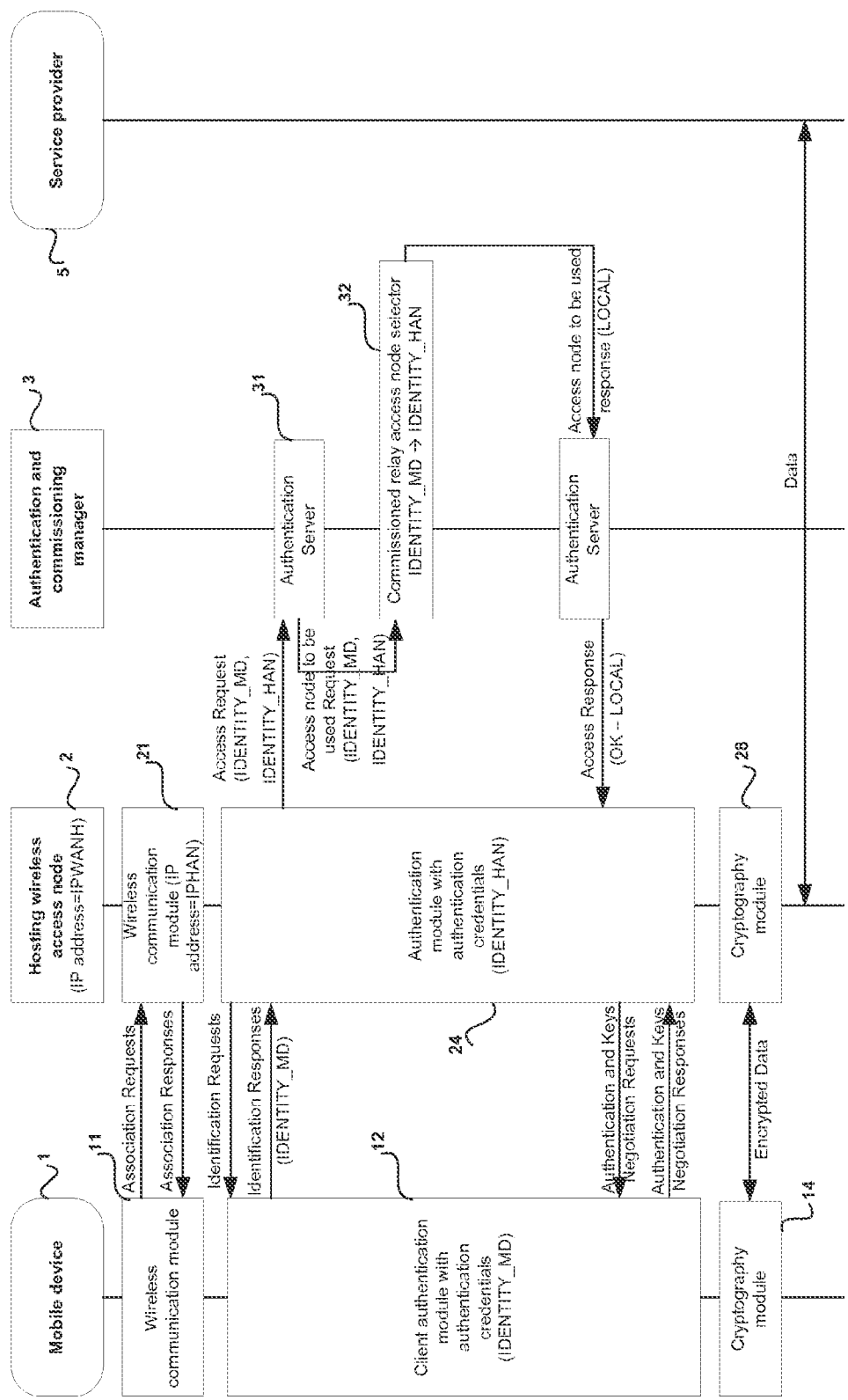

FIG. 12: schematically shows, in an activity diagram, all the interactions among the mobile device, the hosting wireless access node and the authentication and commissioning server together with cryptography modules, if the hosting wireless access node is selected as the commissioned relay access node, according to the method of the present invention.

Figure 13:
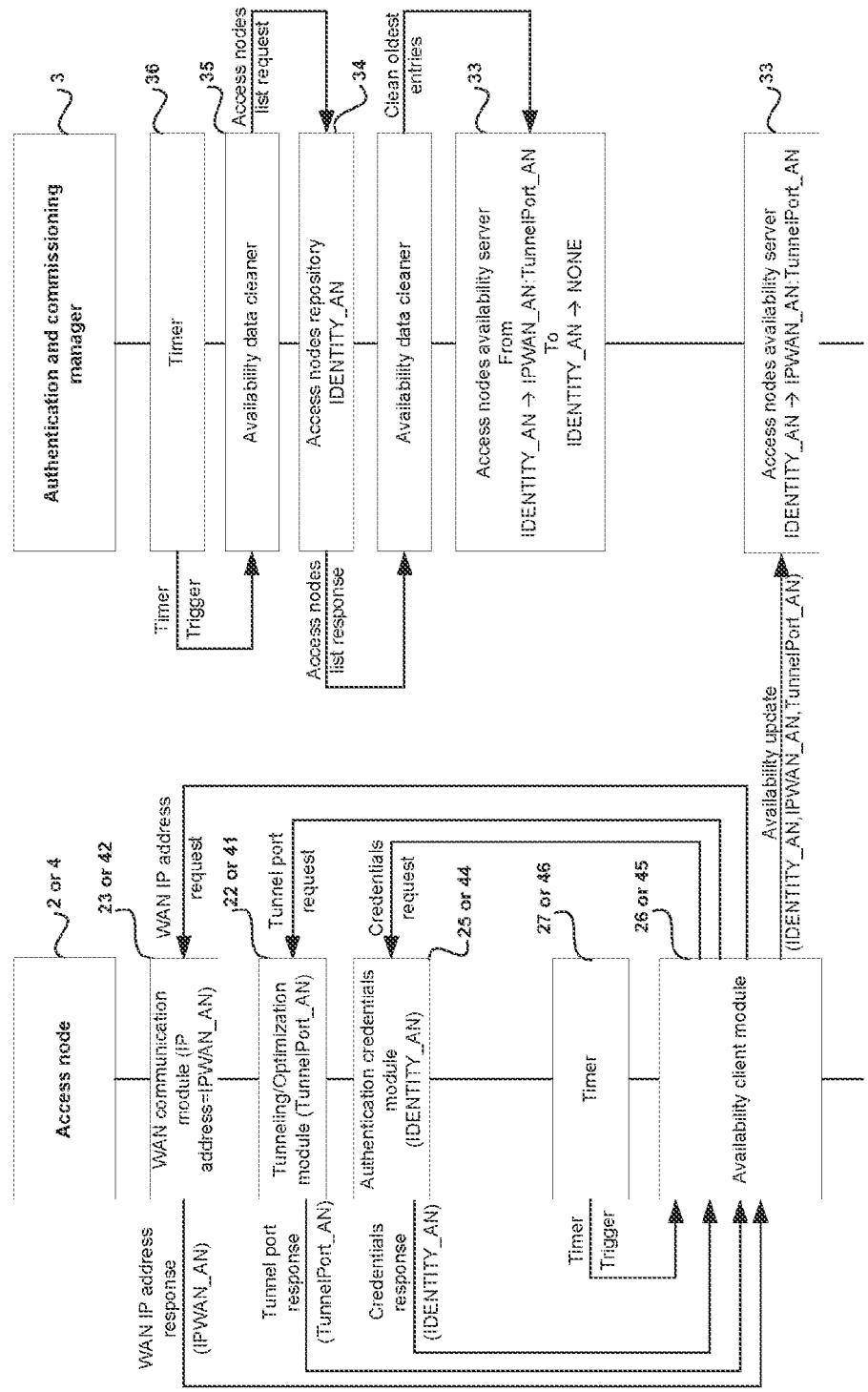

FIG. 13: schematically shows, in an activity diagram, the interactions between an access node and the authentication and commissioning server to update the access node availability server.

DETAILED DESCRIPTION

According to the present invention and with reference to FIG. 3, a method and system for commissioning a wireless connection with a related authentication and the eventual encryption to a remote relay node is described here by.

In the following description the term electronic mobile device 1 is referred to devices of the type comprising one or more physical wireless communication module 11, for supporting corresponding one or more network communications over wireless network channels, and at least one client authentication module 12, for supporting the authentication of the mobile device with an access node who has to manage its traffic, and at least one authentication credentials module 13, for retrieving the authentication credentials to univocally identify who is using the mobile device.

For exemplificative purpose and without limiting the scope of the present invention, the electronic mobile device 1 could be a notebook PC, a netbook PC, an e-book, a PDA, a smart-phones and also a handheld game console, a wireless digital camera or similar devices providing means to communicate over a wireless network channel.

Always for exemplificative purpose without limiting the scope of the invention, some examples of physical wireless communication modules 11 are interfaces for WiFi networks according to the IEEE 802.11 standard, for WiMax according to the IEEE 802.16 standard, for Bluetooth networks (piconets or scatternets) according to the IEEE 802.15.1 standard, for ZigBee networks according to IEEE 802.15.4 standard and the like.

The client authentication module 12 can be embedded into the same adapter implementing the wireless communication module 11 or it can be provided as a native service by the mobile device operating system or it can be provided by an application working in user space. For exemplificative purpose without limiting the scope of the invention, if WiFi is the wireless technology used some examples of client authentication modules 11 implementing the IEEE 802.1X standard are the ones provided natively by the most recent Microsoft and Apple operating systems or the ones provided by the open source OpenSEA Alliance XSupplicant (http://www.openseaalliance.org) or the open source wpa_supplicant (http://hostap.epitest.fi/wpa_supplicant).

The authentication credentials module 13 provides means to univocally identify the mobile device or its user via a multi-factor authentication based for instance on human factors, inherently bound to the individual like biometrics, and/or personal factors, mentally or physically allocated to the individual like code numbers and passwords, and/or technical factors, bound to software means like digital certificates or one-time password lists or bound to physical means like ID cards, security tokens or smart-cards.

In the following description the term hosting wireless access node 2 is referred to devices of the type comprising one or more physical wireless communication module 21, for supporting corresponding one or more network communications over wireless network channels, and at least one WAN communication module 23, for connecting to the Internet, and at least one authentication module 24, for supporting the authentication of the mobile devices whom wish to connect, and at least one tunneling/optimization module 22, providing optimized and authenticated tunnels with other access nodes.

For exemplificative purpose without limiting the scope of the invention, some examples of physical wireless communication modules 21 are interfaces for WiFi networks according to the IEEE 802.11 standard, for WiMax according to the IEEE 802.16 standard, for Bluetooth networks (piconets or scatternets) according to the IEEE 802.15.1 standard, for ZigBee networks according to IEEE 802.15.4 standard and the like.

Always for exemplificative purpose without limiting the scope of the invention, if WiFi is the wireless technology used an example of authentication module 24 implementing the IEEE 802.1X standard is the open source hostapd (http://hostap.epitest.fi/hostapd/).

The tunneling/optimization module 22 provides means to create a tunnel with a similar tunneling/optimization module 41 of a commissioned relay access node 4 selected by the authentication and commissioning manager 3. This tunnel is used to convey the traffic generated by the mobile device 1 and it can provide features like authentication, encryption, compression and traffic shaping to optimize the communication performances. For exemplificative purpose without limiting the scope of the invention, an example of tunneling/optimization module 22 can be based on the open source vtun (http://vtun.sourceforge.net/).

The WAN communication module 23 provides means to connect to the Internet. For exemplificative purpose without limiting the scope of the invention, some examples of WAN communication module 23 are an Ethernet adapter or a WiFi adapter obtaining the Internet connection from a legacy infrastructure, a WiMax adapter, a xDSL modem, a PSTN modem, an ISDN modem, an UMTS or HSDPA modem and the like.

The WAN communication module 23 has at least one IP address used to reach the Internet. Usually the wireless communication module 21 has a different IP address that can be NATted behind the WAN communication module's IP address. Also the IP address of the mobile device 1, which is physically connected to the wireless communication module 21, can be NATted behind the WAN communication module's IP address.

The wireless connection between the mobile device 1 and the hosting wireless access node 2 is always authenticated. The traffic generated by the mobile device can be directly managed and so directly forwarded to the Internet or it can be forwarded to another access node via a tunnel made available by the tunneling/optimization module 22.

In the following description the term authentication and commissioning manager 3 is referred to an Internet server or a cluster of Internet servers comprising at least an authentication server 31, for supporting the centralized authentication of the mobile devices and eventually also of the access nodes, and at least a commissioned relay access node selector 32, providing, for each mobile device authentication credentials at least one commissioned relay access node to be used to manage the mobile device traffic.

The hosting wireless access node 2 and the authentication and commissioning manager 3 can interact directly or via the Internet and eventually with a VPN providing a point-to-point encrypted connection.

In the following description the term commissioned relay access node 4 is referred to devices of the type comprising at least one WAN communication module 42, for connecting to the Internet and to forward the mobile devices traffic, and at least one authentication module 43, for supporting the authentication of the mobile devices whom wish to connect, and at least one tunneling/optimization module 41, for supporting optimized and authenticated tunnels with other access nodes.

The commissioned relay access node 4 and the authentication and commissioning manager 3 can interact directly or via the Internet and eventually with a VPN providing a point-to-point encrypted connection.

The commissioned relay access node 4 and the hosting wireless access node 2 can be generally referred as access nodes. An access node should provide at least the same modules and the same features as a commissioned relay access node, so at least a WAN communication module, an authentication module and a tunneling/optimization module. A registered access node is an access node authorized to interact with the authentication and commissioning manager 3. In the following description we will consider each access node mentioned, hosting wireless access node or commissioned relay access node, as a registered access node.

In the following description the term service provider 5 is referred to Internet servers like for instance web servers or ftp servers or email servers or communication servers or database servers or game servers or peer-to-peer servers or the like.

If the commissioned relay access node 4 has been selected by the authentication and commissioning manager 3 to manage all the traffic generated by the mobile device 1 physically connected to the hosting wireless access node 2, then the data transferred between the mobile device and any Internet service provider 5 is encapsulated into the tunnel between the hosting wireless access node 2 and the commissioned relay access node 4 and is finally forwarded by the commissioned relay access node to the Internet service providers. The Internet service providers there by are exchanging data with the commissioned relay access node and not directly with the hosting wireless access node. For this reason the owner of the hosting wireless access node 4 can allow a guest mobile device 1 to connect to Internet without taking any responsibility for the traffic generated by it.

According to the present invention and with reference to FIG. 4, the hosting wireless access node 2 can make use of additional modules like an authentication credentials module 25, for retrieving the authentication credentials to univocally identify the access node, and an availability client module 26, for updating the authentication and commissioning manager on the availability status of the access node, and a timer 27, for triggering at least the availability client module 26. Also the commissioned relay access node 4 can make use of additional similar modules like an authentication credentials module 44 and an availability client module 45 and a timer 46. Finally the authentication and commissioning manager 3 can make use of additional modules like:

an access nodes availability server 33, collecting availability data from all the registered access nodes' availability client module and providing means to store the association between an access node authentication credentials and at least one IP address and at least one tunnel port on which the access node's tunneling/optimization module is reachable via Internet;

an access node repository 34, for storing the authentication credentials of all the registered access nodes;

an availability data cleaner 35, for resetting the oldest entries, containing at least the IP address and the port associated to an access node's authentication credentials, stored in the access nodes availability server 33;

a timer 36, for triggering at least the availability data cleaner 35.

The authentication credentials module 24 and the authentication credentials module 44 provide means to univocally identify respectively the hosting wireless access node 2 and the commissioned relay access node 4 for instance via software means like digital certificates or onetime password lists or via physical means like ID cards, security tokens or smartcards.

According to the present invention and with reference to FIG. 7, the mobile device 1 interacts with the hosting wireless access node 2 and the commissioned relay access node 4, selected by the authentication and commissioning manager 3, in order to exchange data with a service provider 5 available on the Internet. The wireless communication module 11 of the mobile device 1 initiates an association phase performed at OSI layer 2 by sending an association request to the wireless communication module 21 of the hosting wireless access node 2. The latter eventually replies, if the mobile device connection can be managed, with an association response allowing the mobile device 1 connection. The initial association request and response can contain some details about the wireless communication modules 11 and 21 to achieve the most suitable physical connection and to reach this goal the sequence of association requests and responses can continue as long as needed.

After the association phase is completed, the authentication module 24 of the hosting wireless access node 2 initiates an identification phase performed at OSI layer 2 by sending an identification request to the client authentication module 12 of the mobile device 1 containing at least the type of identification required. The latter eventually replies, if the initial identification request was valid, with an identification response containing at least the authentication credentials of the mobile device 1 or its user; these authentication credentials, from now on referred as IDENTITY_MD, are provided by the authentication credentials module 13 that eventually can prompt the user in case there is an expectation of interaction. The initial identification request and response can be followed as long as needed by additional sequences of identification requests and responses between the client authentication module 12 and authentication module 24 until the identity of the mobile device or its user is assessed. For exemplificative purpose and without limiting the scope of the present invention, the sequence of identification requests and responses can be similar to the sequence of OSI layer 2 identity requests and responses implemented by any system IEEE 802.1X compliant and using the EAP (Extensible Authentication Protocol defined in RFC 3748) methods.

After the identification phase is completed, the authentication module 24 of the hosting wireless access node 2, holding the IDENTITY_MD received from the client authentication module 11, initiates an access verification phase by sending an access request to the authentication server 31 of the authentication and commissioning manager 3. This access request contains at least the mobile device 1 authentication credentials just received, IDENTITY_MD, and the authentication credentials of the hosting wireless access node 2, from now on referred as IDENTITY_HAN, retrieved by its authentication credentials module 25.

Once the authentication server 31 has received an access request it has to prepare an access response to be sent back to the authentication module 24. For this reason it initiates a commissioned relay access node selection phase by sending an "Access node to be used" request to the commissioned relay access node selector 32 containing at least the mobile device 1 authentication credentials, IDENTITY_MD, and the authentication credentials of the hosting wireless access node 2, IDENTITY_HAN. The commissioned relay access node selector 32 contains a map, statically or dynamically updated, that links each mobile device authentication credentials to at least one access node authentication credentials identifying the access node to be used to manage the mobile device traffic. The access nodes authentication credentials mapped to the mobile devices authentication credentials are retrieved by the commissioned relay access node selector 32 from the access nodes repository 34. The access nodes repository 34 stores the authentication credentials of all the registered access nodes, so the access nodes authorized to interact with the authentication and commissioning manager 3, and it can be updated manually or automatically, for instance via a web site, once an access node is registered or unregistered. For exemplificative purpose without limiting the scope of the invention, the access nodes repository 34 contains at least the IDENTITY_HAN and the authentication credentials of the commissioned relay access node 4, from now on referred as IDENTITy_eRN, retrieved by its authentication credentials module 44.

Once the commissioned relay access node selector 32 has received the "Access node to be used" request containing at least the IDENTITY_MD and the IDENTITY_HAN, it checks if the received mobile device authentication credentials are mapped to at least one access node authentication credentials. If not, as shown in FIG. 8, it completes the commissioned relay node selection phase by sending back to the authentication server 31 an "Access node to be used" response containing at least the code NONE. In this case the authentication server 31 completes the access verification phase by sending back to the authentication module 24 of the hosting wireless access node 2 an access response containing at least the code DENIED. In this case, finally, the authentication module 24 should abort the mobile device 1 authentication process.

If instead the mobile device 1 authentication credentials, IDENTITY_MD, received in the "Access node to be used" request are mapped to at least one access node authentication credentials, the commissioned relay access node selector 32 sends an availability request to the access nodes availability server 33 containing at least one of the mapped access node authentication credentials representing the commissioned relay access node candidate(s). For exemplificative purpose without limiting the scope of the invention, the commissioned relay access node selector 32 maps at least the IDENTITY_MD to the IDENTITY_CRN and so it sends to the access nodes availability server 33 an availability request containing at least the IDENTITY_CRN.

The access nodes availability server 33 contains a map, statically or dynamically updated, that links each access node authentication credentials to at least one IP address and at least one port on which the access node's tunneling/optimization module is reachable via Internet to establish a tunnel. For exemplificative purpose without limiting the scope of the invention, the access nodes availability server 33 maps at least the IDENTITY_CRN to the IP address and the tunnel port on which the access node identified by IDENTITY_CRN can be reached via Internet, from now on referred respectively as IPWANC and TunnelPortC.

Once the access nodes availability server 33 has received the availability request containing at least the authentication credentials of the commissioned relay access node candidate(s), it checks if the received access node authentication credentials are mapped to at least one IP address and at least one port. If no one of the commissioned relay access node candidate(s) is available, as shown in FIG. 9, it sends back to the commissioned relay access node selector 32 an availability response containing at least the code NONE. In this case the commissioned relay access node selector 32 completes the commissioned relay access node selection phase by sending back to the authentication server 31 an "Access node to be used" response containing at least the code NONE. In this case the authentication server 31 completes the access verification phase by sending back to the authentication module 24 of the hosting wireless access node 2 an access response containing at least the code DENIED. In this case, finally, the authentication module 24 should abort the mobile device 1 authentication process.

If instead at least one of the authentication credentials of the commissioned relay access node candidate(s) received in the availability request are mapped to at least one IP address and at least one port, hence at least one commissioned relay access node candidate is available, the access nodes availability server 33 sends back to the commissioned relay access node selector 32 an availability response containing for each available commissioned relay access node candidate at least one IP address and at least one tunnel port. For exemplificative purpose without limiting the scope of the invention, the access nodes availability server 33 sends to the commissioned relay node selector 32 an availability response containing at least the IPWANC and the TunnelPortC.

Once the commissioned relay node selector 32 has received the availability response from the access nodes availability server 33 it selects only one of the available commissioned relay access node candidates to be used by the mobile device 1 and completes the commissioned relay access node selection phase by sending back to the authentication server 31 an "Access node to be used" response containing at least one IP address and at least one tunnel port. For exemplificative purpose without limiting the scope of the invention, the commissioned relay node selector 32 sends back to the authentication server 31 an "Access node to be used" response containing at least the IPWANC and the TunnelPortC.

Once the authentication server 31 has received the "Access node to be used" response from the commissioned relay access node selector 32 it completes the access verification phase by sending back to the authentication module 24 of the hosting wireless access node 2 an access response containing at least the code OK and at least one IP address and at least one tunnel port to reach the selected commissioned relay access node 4. For exemplificative purpose without limiting the scope of the invention, the authentication server 31 sends back to the authentication module 24 of the hosting wireless access node 2 an access response containing at least the code OK and the IPWANC and the TunnelPortC.

After the access verification phase has been successfully completed and so an available commissioned relay access node 4 has been identified, the authentication module 24 of the hosting wireless access node 2 sends a tunnel creation request to the tunneling/optimization module 22 of the same access node containing the at least one IP address and the at least one tunnel port just received from the authentication server 31 and at least the physical address of the mobile device 1 derived from the association request(s) or the identification response(s) received from it. The tunneling/optimization module 22 uses this data to initiates a tunnel creation phase by sending a tunnel request to the tunneling/optimization module 41 of the selected commissioned relay access node 4. The latter eventually completes the tunnel creation phase by sending back to the tunneling/optimization module 22 of the hosting wireless access node 2 a tunnel response containing at least the code OK if it is able to manage the additional tunnel. If instead it is not able to manage the additional tunnel the tunnel response contains at least the code DENIED. In this case the tunneling/optimization module 22 of the hosting wireless access node 2 replies to the authentication module 24 of the same access node with a tunnel creation response containing at least the code DENIED. In this case, finally, the authentication module 24 should abort the mobile device 1 authentication process.

The initial tunnel request and response can be followed as long as needed by additional sequences of tunnel requests and responses between the tunneling/optimization module 22 and the tunneling/optimization module 41 until an authenticated and eventually encrypted and eventually optimized tunnel making use of compression and traffic shaping techniques has been established.

Once the tunneling/optimization module 22 of the hosting wireless access node 2 has received the tunnel response containing at least the code OK, it maps the tunnel just created with the physical address of the mobile device 1 received from the authentication module 24, in order to be able to forward all the traffic exchanged on this tunnel to/from the mobile device 1, and then replies to the authentication module 24 of the same access node with a tunnel creation response containing at least the code OK.

Once the authentication module 24 of the hosting wireless access node 2 has received the tunnel creation response containing at least the code OK it initiates and completes the transfer of the authentication state phase by sending encapsulated through the tunnel, created between the tunneling/optimization module 24 and the tunneling/optimization module 41 of the commissioned relay access node 4, at least the mobile device 1 authentication credentials, IDENTITY_MD. The tunneling/optimization module 41 of the commissioned relay access node 4 then forwards the mobile device 1 authentication credentials to the authentication module 43 of the same access node.

Once the authentication module 43 of the commissioned relay access node 4 has received the mobile device 1 authentication credentials it initiates an authentication phase performed at OSI layer 2 by sending encapsulated through the tunnel, created between the tunneling/optimization module 41 and the tunneling/optimization module 22 of the hosting wireless access node 2, an authentication request, included in OSI layer 2 data units, to the client authentication module 12 of the mobile device 1. The tunneling/optimization module 22 of the hosting wireless access node 2 forwards the OSI layer 2 authentication request to the mobile device 1 by using the mobile device 1 physical address received by the authentication module 24.

Once the client authentication module 12 of the mobile device 1 receives the authentication request it replies with an OSI layer 2 authentication response that is forwarded, encapsulated into the tunnel with the commissioned relay access node 4, by the tunneling/optimization module 22 of the hosting wireless access node 2. The tunneling/optimization 41 of the commissioned relay access node 4 then forwards the received authentication response to the authentication module 43 of the commissioned relay access node 4.

The initial authentication request and response can be followed as long as needed by additional sequences of authentication requests and responses between the authentication module 43 and the client authentication module 12 until an authenticated and trusted connection between the mobile device 1 and the commissioned relay access node 4 has been established. For exemplificative purpose and without limiting the scope of the present invention, the sequence of authentication requests and responses can be similar to the sequence of OSI layer 2 authentication requests and responses implemented by any system IEEE 802.1X compliant and using the EAP (Extensible Authentication Protocol defined in RFC 3748) methods.

According with the present invention it is worth to point out that the authentication of the mobile device 1 is not performed by the hosting wireless access node 2 to which it is physically associated but it is instead performed by the commissioned relay access node 4.

After the authentication phase has been successfully completed the mobile device 1 can initiate a data transfer phase to exchange data with a service provider 5; the data exchanged by the mobile device 1, contained in OSI layer 2 data units and transmitted on the wireless connection with the hosting wireless access node 2, is encapsulated into the tunnel between the hosting wireless access node 2 and the commissioned relay access node 4; the data is then extracted from the OSI layer 2 data units and finally forwarded by the commissioned relay access node 4 to the service provider 5.

According with the present invention it is worth to point out that the management of the data exchanged by the mobile device 1 with a service provider 5 available on the Internet is performed at OSI layer 2. In fact the tunneling/optimization module 22 of the hosting wireless access node 2 encapsulates the OSI layer 2 data units coming from the mobile device 1 on the wireless channel, eventually after a processing phase (for instance in case they are compressed in order to optimize the communication), and delivers them to the commissioned relay access node 2. The latter decapsulates those OSI layer 2 data units and, eventually after a processing phase (for instance in case those OSI layer 2 data units have to be decompressed), includes their content in other OSI layer 3 or higher data units to be sent to the service provider 5 available on the Internet. Once the commissioned relay access node 2 receives data from the service provider 5 destined to the mobile device 1, it creates OSI layer 2 data units containing this data, eventually processes them to optimize the communication, and then its tunneling/optimization module 41 encapsulates and delivers them to the hosting wireless access node 2. Once the hosting wireless access node 2 receives, after decapsulation and eventual processing, those OSI layer 2 data units it forwards them to the mobile device 1 on the wireless channel.

According with the present invention it is worth to point out that the service provider 5 is exchanging data with the commissioned relay access node 4 and not directly with the hosting wireless access node 2 and so the present invention provides a method and system to protect the hosting wireless access node owner and the guest mobile device owner from the potential security risks of identity-theft and usurpation, while allowing the guest mobile device to connect to the Internet through the hosting wireless access node owner.

According to the present invention and with reference to FIG. 5, the mobile device 1 can make use of an additional cryptography module 14, for encrypting/decrypting the data exchanged with a commissioned relay access node. Also the commissioned relay access node 4 can make use of a similar cryptography module 47, for encrypting/decrypting the data exchanged with the mobile device 1.

According to the present invention and with reference to FIG. 10, if the cryptography is used the authentication phase initiated by the authentication module 43 of the commissioned relay access node 4 is followed by a keys negotiation phase performed at OSI layer 2, comprising one or more sequences of keys negotiation requests and responses, to handshake with the mobile device client authentication module 12 at least one session key to be used for encrypting/decrypting the data exchanged on the authenticated and trusted connection between the mobile device 1 and the commissioned relay access node 4. The sequences of the keys negotiation requests and responses, included in OSI layer 2 data units, are encapsulated into the tunnel between the commissioned relay access node 4 and the hosting wireless access node 2. For exemplificative purpose and without limiting the scope of the present invention, if WiFi is the technology used the sequence of keys negotiation requests and responses can be similar to the sequence of OSI layer 2 keys negotiation requests and responses implemented by any system compliant with IEEE 802.11i standard.

After the keys negotiation phase has been successfully completed the mobile device 1 can initiate an encrypted data transfer phase to exchange data with a service provider 5. The data is encrypted by the cryptography module 14 of the mobile device 1 and it is encapsulated into the tunnel between the hosting wireless access node 2 and the commissioned relay access node 4. When the data reaches the commissioned relay access node 4 it is decrypted by the cryptography module 47 and finally it is forwarded by the commissioned relay access node 4 to the service provider 5.

According with the present invention it is worth to point out that the data exchanged between the mobile device 1 and the service provider 5 is encrypted between the mobile device 1 and the commissioned relay access node 4. Hence the hosting wireless access node 2, also if it is controlling the tunnel with the commissioned relay access node 4 and also if it is managing the physical connection of the mobile device 1, is not able to understand what the mobile device 1 is sending/receiving and it is not able to insert/remove data (for instance for phishing purposes). So the present invention provides a method and system to protect the guest mobile device owner from the potential security risks of identity-theft and usurpation while connecting to a hosting wireless access node.

Furthermore, according with the present invention it is worth to point out that the mobile device 1 contains only modules, like the physical wireless communication module 11 and the client authentication module 12 and the authentication credentials module 13 and eventually the cryptography module 14, that are normally available in Notebook PCs, netbook PCs, e-books, PDAs, smart-phones and other similar devices able to communicate over a wireless network channel of the type WiFi, WiMax, Bluetooth or similar. Hence the present invention does not require special or custom mobile devices and it can be used by the majority of the mobile devices with wireless communication capabilities already available on the market.

According to the present invention it is possible that the commissioned relay access node selector module 32 of the authentication and commissioning server 3 selects the hosting wireless access node 2 as the commissioned relay access node. In this case the hosting wireless access node 2 has to manage directly the traffic exchanged between the mobile device 1 and the service provider 5. With reference to FIG. 11, once the authentication server 31 has received an access request it initiates a commissioned relay access node selection phase by sending an "Access node to be used" request to the commissioned relay access node selector 32 containing at least the mobile device 1 authentication credentials, IDENTITY_MD, and the authentication credentials of the hosting wireless access node 2, IDENTITY_HAN. Once the commissioned relay access node selector 32 has received this "Access node to be used" request, it checks if the received mobile device 1 authentication credentials are mapped to at least one access node authentication credentials. If the mobile device 1 authentication credentials, IDENTITY_MD, are mapped to the hosting wireless access node 2 authentication credentials, IDENTITY_HAN, the commissioned relay node selector 32 can select the hosting wireless access node 2 as the commissioned relay access node to be used by the mobile device 1 and can complete the commissioned relay access node selection phase by sending back to the authentication server 31 an "Access node to be used" response containing at least the code LOCAL. Once the authentication server 31 has received this "Access node to be used" response, it completes the access verification phase by sending back to the authentication module 24 of the hosting wireless access node 2 an access response containing at least the code LOCAL. Once the authentication module 24 of the hosting wireless access node 2 has received this access response with the code LOCAL, the tunnel creation phase and the transfer of the authentication state phases are skipped and it initiates an authentication phase performed at OSI layer 2 by sending an authentication request to the client authentication module 12 of the mobile device 1. Once the client authentication module 12 of the mobile device 1 receives this authentication request it replies with an authentication response and the initial authentication request and response can be followed as long as needed by additional sequences of authentication requests and responses until an authenticated and trusted connection between the mobile device 1 and the hosting wireless access node 2 has been established. After the authentication phase has been successfully completed the mobile device 1 can initiate a data transfer phase to exchange data with a service provider 5 and the data is directly forwarded to the service provider 5 by the hosting wireless access node 2 instead of being encapsulated in a tunnel.

According to the present invention and with reference to FIG. 5 and FIG. 12, the mobile device 1 can make use of an additional cryptography module 14 and also the hosting wireless access node 2 can make use of a similar cryptography module 28, for encrypting/decrypting the data exchanged with the mobile device 1. If the hosting wireless access node 2 has been selected as the commissioned relay access node and if the cryptography is used, the authentication phase initiated by the authentication module 24 of the hosting wireless access node 2 is followed by a keys negotiation phase, comprising one or more sequences of keys negotiation requests and responses, to handshake with the mobile device client authentication module 12 at least one session key to be used for encrypting/decrypting the data exchanged on the authenticated and trusted connection between the mobile device 1 and the hosting wireless access node 2. After the keys negotiation phase has been successfully completed the mobile device 1 can initiate an encrypted data transfer phase to exchange data with a service provider 5. The data is encrypted by the cryptography module 14 of the mobile device 1 and it is decrypted by the cryptography module 28 of the hosting wireless access node 2 and it is then directly forwarded by the hosting wireless access node 2 to the service provider 5 instead of being encapsulated in a tunnel.

According to the present invention and with reference to FIG. 13, the access nodes availability server 33 can be updated by the availability client module of an access node, like the availability client module 26 of the hosting wireless access node 2 and the availability client module 45 of the commissioned relay access node 4, and by the availability data cleaner 35 of the authentication and commissioning manager 3. The availability client module of an access node, triggered on a regular basis by a timer of the same access node, like the timer 27 of the hosting wireless access node 2 and the timer 46 of the commissioned relay access node 4, sends a credentials request to the authentication credentials module of the same access node, like the authentication credentials module 25 of the hosting wireless access node 2 and the authentication credentials module 44 of the commissioned relay access node 4, to retrieve the authentication credentials of the access node. Once the availability client module has received the credentials response containing at least the authentication credentials of the access node, from now on referred as IDENTITY_AN, it sends a tunnel port request to the tunneling/optimization module of the same access node, like the tunneling/optimization module 22 of the hosting wireless access node 2 and the tunneling/optimization module 41 of the commissioned relay access node 4, to retrieve at least one tunnel port on which the tunneling/optimization module is reachable via Internet to establish a tunnel. Once the availability client module has received the tunnel port response containing at least one tunnel port, from now on referred as TunneiPorCAN, it sends a WAN IP address request to the WAN communication module of the same access node, like the WAN communication module 23 of the hosting wireless access node 2 and the WAN communication module 42 of the commissioned relay access node 4, to retrieve at least one IP address used to reach the Internet. Once the availability client module has received the WAN IP address response containing at least one IP address used to reach the Internet, from now on referred as IPW AN_AN, it sends an availability update message to the access nodes availability server 33 of the authentication and commissioning manager 3 containing at least the IDENTITY_AN, the IPWAN_N and the TunnelPort_AN. Once the access nodes availability server has received the availability update message containing at least the access node authentication credentials and at least one IP address used to reach the Internet and at least one tunnel port on which the access node is reachable via Internet to establish a tunnel, it stores or eventually updates the association between the access node authentication credentials and at least one IP address and at least one tunnel port on which the access node's tunneling/optimization module is reachable via Internet.

The availability data cleaner 35 of the authentication and commissioning manager 3, triggered on a regular basis by a timer 36 of the authentication and commissioning manager 3, sends an access nodes list request to the access node repository 34 of the authentication and commissioning manager 3 to retrieve the authentication credentials of all the registered access nodes. Once the availability data cleaner 35 receives the access nodes list responses containing at least the authentication credentials of all the registered access nodes, it sends a clear oldest entries message to the access nodes availability server 33. Once the access nodes availability server 33 receives the clean oldest entries message, it resets, on the basis of the age of the entries, the at least one IP address and the at least one tunnel port mapped to the oldest access nodes authentication credentials entries. This data is eventually updated by the availability client module of an access node with an availability update message.

According with the present invention it is worth to point out that the access nodes availability server 33 of the authentication and commissioning manager 3 stores the association between each registered access node authentication credentials and at least one IP address and at least one tunnel port on which the registered access node's tunneling/optimization module is reachable via Internet. Those IP address and tunnel port are the ones provided by the availability client module of each registered access node with an availability update message, only if the access node has a public WAN IP address. If instead the registered access node is behind a NAT, its WAN IP address can't be reached by Internet directly and so the access nodes availability server 33 will store for this access node the IP address and port, through which it is reachable via Internet, retrieved by using NAT traversal techniques. For exemplificative purpose without limiting the scope of the invention, example of NAT traversal techniques can be hole punching techniques or STUN (Simple Traversal of User Datagram Protocol through Network Address Translators—RFC3489 and RFC5389).

According to the present invention and with reference to FIG. 6, a plurality of mobile devices can be simultaneously connected to the same hosting wireless access node 2. The traffic of each one, if not directly managed, is redirected, encapsulated in tunnels, to the commissioned relay access nodes selected by the commissioned relay access node selector 32 of the authentication and commissioning manager 3. Furthermore a plurality of access nodes can be managed by the same authentication and commissioning manager 3.

According with the present invention it is worth to point out that the data exchange between a guest mobile device and a service provider on the Internet through a hosting wireless access node is provided by the secure and trusted infrastructure among the hosting wireless access node and the commissioned relay access node and the guest mobile device that is able to reduce and hence minimize the potential security risks of identity-theft and usurpation. Furthermore the commissioning of the wireless connection through the relay access node, the flexibility of the separation and distinct management of the encapsulation and the authentication and the eventual encryption and the OSI layer 2 network processing provide unique innovation value to this invention.

What is claimed is:

1. A method for commissioning a wireless connection with a related authentication to a remote relay node, whereto an electronic mobile device is connected through at least one wireless communication module to a hosting wireless access node for transferring data with respect to a service provider available on the Internet by means of a commissioned relay access node selected by an authentication and commissioning manager, the method comprising:

initiating an association phase by the mobile device wireless communication module to establish a connection with at least one wireless communication module of the hosting wireless access node, the association phase to be performed at OSI layer 2;

initiating an identification phase by an authentication module of the hosting wireless access node to retrieve from a client authentication module of the mobile device at least its authentication credentials provided by an authentication credentials module, the identification phase to be performed at OSI layer 2;

initiating an access verification phase by the hosting wireless access node authentication module to retrieve from an authentication server of the authentication and commissioning manager the commissioned relay access node to be used;

initiating a commissioned relay access node selection phase by the authentication server to retrieve from a commissioned relay access node selector of the authentication and commissioning manager the commissioned relay access node to be used;

initiating a tunnel creation phase by a tunnel/optimization module of the hosting wireless access node to establish a tunnel with a tunneling/optimization module of the commissioned relay access node;

initiating a transfer of the authentication state phase by the hosting wireless access node authentication module to transfer at least the mobile device authentication credentials to an authentication module of the selected commissioned relay access node, the transfer being encapsulated into the tunnel;

initiating an authentication phase by the commissioned relay access node authentication module to handshake with the mobile device client authentication module the authentication data used to establish a trusted connection between the commissioned relay access node and the mobile device, the authentication phase to be performed at OSI layer 2, the handshaking, using OSI layer 2 data units, being encapsulated into the tunnel between the commissioned relay access node and the hosting wireless access node; and initiating a keys negotiation phase by the commissioned relay access node authentication module to handshake with the mobile device client authentication module at least one session key to be used for the data encryption from a cryptography module of the mobile device and a cryptography module of the commissioned relay access node, the keys negotiation phase to be performed at OSI layer 2, the handshaking, using OSI layer 2 data units, being encapsulated into the tunnel between the commissioned relay access node and the hosting wireless access node;

performing a data transfer phase to transfer data between the mobile device and the service provider, the data exchanged by the mobile device, contained in OSI layer 2 data units, encrypted by the cryptography module and transmitted on the wireless connection with the hosting wireless access node, being encapsulated into the tunnel between the hosting wireless access node and the commissioned relay access node, and the data then being extracted from the OSI layer 2 data units, decrypted by the cryptography module and forwarded by the commissioned relay access node to the service provider;

wherein data is thereby exchanged by the service provider with the commissioned relay access node and not directly with the hosting wireless access node.

2. The method according to the claim 1, wherein providing the access verification phase comprises:

sending an access request by the authentication module of the hosting wireless access node to the authentication server of the authentication and commissioning server, the access request containing at least the authentication credentials of the mobile device and at least the access node authentication credentials provided by an authentication credentials module of said hosting wireless access node; and providing an access response, generated by the authentication server provided by the authentication and commissioning manager, containing at least one IP address and at least one tunnel port to be used by the tunneling/optimization module of the hosting wireless access node to establish a tunnel with the tunneling/optimization module of the commissioned relay access node to be used.

3. The method according to the claim 2, wherein the commissioned relay access node selector selects the commissioned relay access node to be used by the mobile device and its availability, by means of a commissioned relay access node selection phase comprising:

identifying, by the commissioned relay access node selector, of at least one commissioned relay access node candidate on the basis of a static or dynamic mapping of the mobile device authentication credentials to at least one access node authentication credentials contained in an access nodes repository of the authentication and commissioning manager;

providing an availability request sent by the commissioned relay access node selector to an access nodes availability server, the availability request containing at least the authentication credentials of at least one commissioned relay access node candidate;

providing an availability response generated by the access node availability server, the availability response containing at least one IP address and at least one tunnel port for each commissioned relay access node candidate; and providing the selection of only one of the available commissioned relay access node candidates to be used by the mobile device.

4. The method according to the claim 3, wherein the access nodes availability server contains a static or dynamic mapping between each access node authentication credentials and at least one IP address and at least one tunnel port on which the access node can be contacted to establish a tunnel.

5. The method according to the claim 3, wherein the access response contains at least a code indicating to the authentication module of the hosting wireless access node that the mobile device authentication process should be aborted in case the mobile device authentication credentials are not mapped to any one of the access node authentication credentials contained in the access nodes repository.

6. The method according to the claim 4, wherein the availability response contains at least a code indicating to the commissioned relay access node selector that no one of the commissioned relay access node candidates is available and so the access response should contain at least a code indicating to the authentication module of the hosting wireless access node that the mobile device authentication process should be aborted.

7. The method according to the claim 4, wherein the access nodes availability server is updated by an availability client module of an access node and by an availability data cleaner of the authentication and commissioning manager.

8. The method according to the claim 7, wherein at least one of the availability client module of said hosting wireless access node or the availability client module of said commissioned relay access node, triggered by a respective timer, sends an availability update message to the access nodes availability server containing
- at least the authentication credentials retrieved from at least one of a respective authentication credentials module of said hosting wireless access node or said commissioned relay access node and
- at least one respective IP address retrieved from at least one of a WAN communication module of said hosting wireless access node or said commissioned relay access node and
- at least one respective tunnel port retrieved from at least one of a tunneling/optimization module of said hosting wireless access node or said commissioned relay access node.

9. The method according to the claim 7, wherein the availability data cleaner, triggered by a timer of the authentication and commissioning manager, retrieves from the access nodes repository at least the list of the access nodes it contains and then sends a request to the access nodes availability server for resetting, on the basis of the age of the entries, the at least one IP address and the at least one tunnel port mapped to the oldest access nodes authentication credentials entries, this data being eventually updated by the availability client module of an access node with an availability update.

10. The method according to the claim 9, wherein each of a plurality of mobile devices is capable of being simultaneously connected to the same hosting wireless access node; and
wherein the traffic of each of the plurality of mobile devices, if not directly managed, is redirected, encapsulated in tunnels, to the commissioned relay access nodes selected by the commissioned relay access node selector of the authentication and commissioning manager.

11. The method according to the claim 10, wherein a plurality of access nodes is capable of being managed by the same authentication and commissioning manager.

12. A system for commissioning a wireless connection with a related authentication to a remote relay node, whereto an electronic mobile device is able to establish a connection with a hosting wireless access node for transferring data with respect to a service provider available on the Internet by means of a commissioned relay access node selected by an authentication and commissioning manager,
the electronic mobile device comprising:
- at least one wireless communication module to establish a connection with the hosting wireless access node;
- at least one client authentication module providing
  means to authenticate the mobile device connection, by exchanging OSI layer 2 identification requests and responses with an authentication module of the hosting wireless access node and by exchanging OSI Layer 2 authentication requests and responses with an authentication module of the commissioned relay access node, and providing
  means to define at least one session key to be used for at least one of an encryption process or a decryption process, by exchanging OSI layer 2 keys negotiation request and responses with an authentication module of the commissioned relay access node;
- at least one cryptography module providing means to perform at least one encryption or decryption of the data exchanged with the commissioned relay access node; and
- at least one authentication credentials module providing means to univocally identify the mobile device or its user;

the hosting wireless access node comprising:
- at least one wireless communication module providing means to manage at least one wireless connection;
- at least one WAN communication module providing means to reach the Internet;
- at least one authentication module providing means to retrieve at OSI layer 2 from the mobile device client authentication module at least its authentication credentials,
  means to retrieve from the authentication and commissioning manager the commissioned relay access node to be used, and
  means to transfer to the commissioned relay node the retrieved mobile device authentication credentials; and
- at least one tunneling/optimization module providing
  means to manage and eventually optimize at least one tunnel connection with a commissioned relay access node,
  means to encapsulate and send into this tunnel the mobile device authentication credentials,
  means to perform at least one of encapsulation or decapsulation of the OSI Layer 2 authentication requests and responses exchanged between the mobile device and the commissioned relay access node,
  means to encapsulate the data, contained in OSI layer 2 data units and received on the wireless connection, sent from the mobile device to the service provider, and
  means to decapsulate and forward to the mobile device the data, included in OSI layer 2 data units received from the commissioned relay access node 4, sent from the service provider;

the authentication and commissioning manager comprising:
- at least one commissioned relay access node selector providing means to statically or dynamically map each mobile device authentication credentials to at least one access node authentication credentials; and
- at least one authentication server providing means to communicate to the hosting wireless access node authentication module the access node to be used to manage the traffic generated by the mobile device;

the commissioned relay access node comprising:
- at least one WAN communication module providing means to reach the Internet;
- at least one authentication module providing
  means to authenticate the connected mobile device in order to obtain a trusted connection, by retrieving the mobile device authentication credentials from the hosting wireless access node authentication module and by exchanging OSI layer 2 authentication requests and responses with the mobile device client authentication module and means to define at least one session key to be used for at least one of an encryption process or a decryption process, by exchanging OSI layer 2 keys negotiation requests and responses with the mobile device client authentication module; and at least one tunneling/optimization module providing means to manage and eventually optimize at least one tunnel connection with a hosting wireless access node, means to decapsulate the mobile device authentication credentials received and make them available to the authentication module, means to perform at least one of encapsulation or decapsulation of the OSI layer 2 authentication requests and responses exchanged with the mobile device, means to encapsulate the data from the service provider, after including it into OSI layer 2 data units, to the mobile device, and means to decapsulate and forward to the service provider the data sent from the mobile device; and the commissioned relay access node comprising:

at least one cryptography module providing means to perform at least one of encryption or decryption the data exchanged with the mobile device.

13. The system according to claim 12, wherein the hosting wireless access node comprises at least an authentication credentials module providing means to univocally identify the access node;

wherein the authentication module of the hosting wireless access node provides further means to send to the authentication server of the authentication and commissioning server at least the authentication credentials of the mobile device and at least the access node authentication credentials provided by the authentication credentials module; and wherein the authentication server of the authentication and commissioning manager provides further means to send to the authentication module of the hosting wireless access node at least the one IP address and at least one tunnel port to be used by the tunneling/optimization module of the hosting wireless access node to establish a tunnel with the tunneling/optimization module of the commissioned relay access node to be used.

14. The system according to the claim 13, wherein the authentication and commissioning manager comprises:

at least one access nodes repository providing means to statically or dynamically store at least the authentication credentials of the access nodes; and at least one access nodes availability server providing means to identify the available access nodes and means to associate each available access node authentication credentials to at least one IP address and at least one tunnel port on which the access node can be contacted to establish a tunnel; and wherein the commissioned relay access node selector of the authentication and commissioning manager provides further means to retrieve from the access nodes availability server at least one IP address and at least one tunnel port for each one of the access nodes mapped to the mobile device authentication credentials and further means to select only one commissioned relay access node.

15. The system according to the claim 14, wherein the authentication server of the authentication and commissioning manager provides further means to communicate to the hosting wireless access node authentication module at least a code indicating that the mobile device authentication process should be aborted if the mobile device authentication credentials are not mapped to any one of the access node authentication credentials contained in the access node repository or if no one of the access nodes mapped to the mobile device authentication credentials is identified as available by the access nodes availability server.

16. The system according to the claim 14, wherein at least one of the hosting wireless access node and the commissioned relay access node comprises at least one availability client module providing means to update the access nodes availability server of the authentication and commissioning manager; and wherein the authentication and commissioning manager comprises at least one availability data cleaner providing means to update the access nodes availability server.

17. The system according to the claim 16, wherein at least one of the hosting wireless access node and the commissioned relay access node comprises at least one timer to trigger the availability client module of the same access node; and wherein the access node availability client module provides further means to collect and to send to the access nodes availability server of the authentication and commissioning manager, once triggered by the timer, at least the access node authentication credentials retrieved from the access node authentication credentials module and at least one IP address retrieved from the access node WAN communication module and at least one tunnel port retrieved from the access node tunneling/optimization module.

18. The system according to the claim 16, wherein the authentication and commissioning manager comprises at least one timer to trigger the availability data cleaner; and wherein the availability data cleaner of the authentication and commissioning manager provides further means to retrieve from the access nodes repository, once triggered by the timer, at least the list of the access nodes it contains and further means to send a request to the access nodes availability server for resetting the at least one IP address and the at least one tunnel port mapped to the oldest access nodes authentication credentials entries, those data being eventually updated by the access nodes availability client modules.

19. The system according to the claim 18, wherein the hosting wireless access node comprises:

means to support a plurality of mobile devices simultaneously connected; and means to directly manage their traffic or redirect it, encapsulated in tunnels, to the commissioned relay access nodes selected by the commissioned relay access node selector of the authentication and commissioning manager.

20. The system according to the claim 19, wherein the authentication and commissioning manager comprises:

means to support a plurality of access nodes.

* * * * *